July 12, 1938.  W. F. EISENHAUER  2,123,772
SPRING CLIP
Filed March 11, 1936
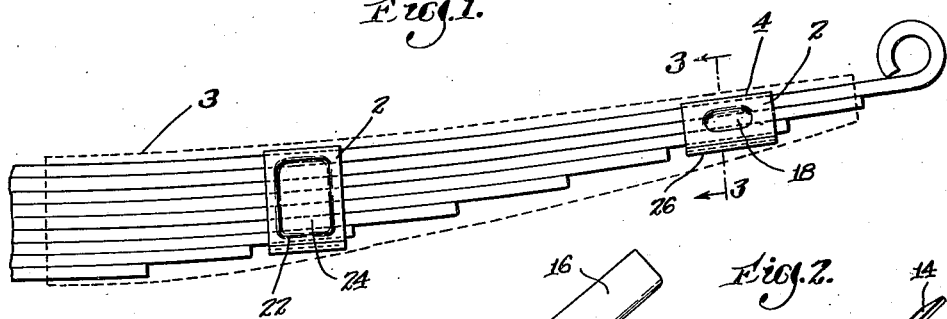
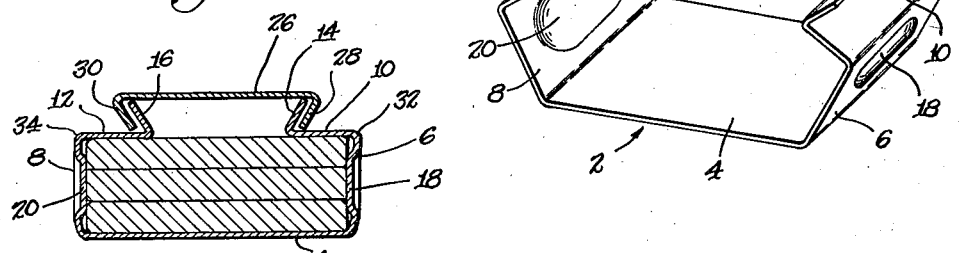
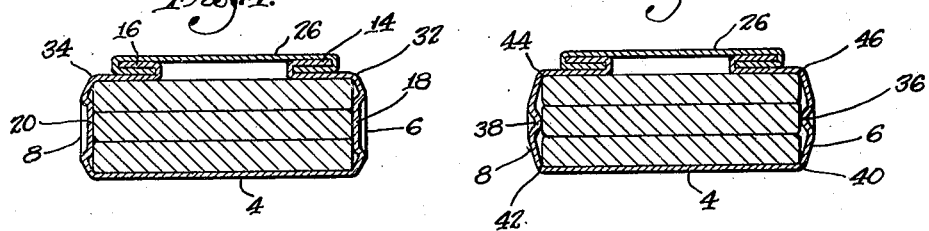
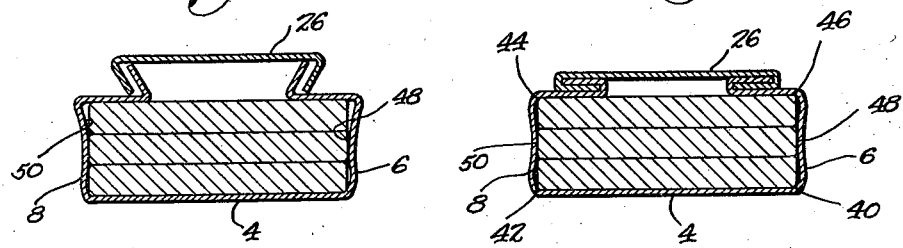
Inventor
Warren F. Eisenhauer
by C. Yardley Chittick
    Attorney Patented July 12, 1938

2,123,772

UNITED STATES PATENT OFFICE 2,123,772

SPRING CLIP

Warren F. Eisenhauer, Watertown, Mass., assignor, by mesne assignments, to F. L. Jacobs Company, Detroit, Mich., a corporation of Michigan Application March 11, 1936, Serial No. 68,235

7 Claims. (Cl. 267—53)

This invention pertains to spring clips for leaf springs such as used on automobiles or trucks or other automotive vehicles.

One of the objects of this invention is to provide a new means for holding the leaves of springs in longitudinal alignment, and in so doing, to eliminate one of the causes of noise.

Another object of my invention is to provide a spring clip of the same general type that is now in common use and adapted for application to springs by the same equipment, but at the same time to provide a clip which will keep the leaves in alignment and will eliminate certain unpleasant spring noises which are now prevalent during the operation of an automobile.

Another object is to provide a spring clip, having the foregoing features, that may be used in connection with spring covers.

This invention constitutes an improvement over spring clips of the general type shown by Parkhill in United States Patent, No. 1,970,765.

In the drawing:

Fig. 1 shows a typical leaf spring with my spring clips applied thereto.

Fig. 2 shows the main portion of the spring clip incorporating my invention.

Fig. 3 is a cross-sectional view on the line 3—3 of Fig. 1 after application of the spring clip to the spring but prior to permanent sealing thereon.

Fig. 4 is a cross-sectional view on the line 3—3 of Fig. 1, showing the clip permanently affixed to the spring.

Fig. 5 shows a modified form of my invention.

Figs. 6 and 7 show another modification of my invention.

In Fig. 1 is seen the general location of the spring clips 2 with relation to the leaves of the spring. The usual purpose of the spring clip is to hold the leaves in longitudinal alignment to prevent fanning of the leaves during operation. That is to say, in a spring without a spring clip, the longer leaves shift laterally with respect to adjacent leaves. This is undesirable for it impairs the efficiency of the spring, and in the case where the spring is enclosed by an articulated metal spring cover, the outline of which is shown at 3, fanning of the leaves is likely to damage the cover. In addition, a spring clip prevents separation of the leaves on the rebound, and eliminates a certain amount of noise.

Heretofore, when a clip of the type shown by Parkhill, above referred to, was secured in position, the side portions of the clip, having no reinforcing means on the sides, assumed a slightly arcuate form and could not be made to engage the intermediate leaves. Thus, while clips of the Parkhill type in general prevent any substantial lateral movement of the leaves, still a slight lateral movement of the intermediate leaves is possible. This slight movement manifests itself in an undesirable clicking noise as the spring is flexed in use.

My invention, however, prevents lateral movement of the intermediate leaves and as a consequence the undesirable clicking noises are done away with.

Referring to Figs. 1 and 2, my spring clip is designated generally by the number 2. The lower portion of the clip consists of a bottom 4 and sides 6 and 8 which are to enclose the bottom and two sides of the leaves at the section at which the clip is to be used. Extending over part of the fourth side of the spring are the portions 10 and 12 which terminate in the reversely turned flanges 14 and 16.

Embossed on the two sides 6 and 8 are the inwardly extending projections 18 and 20. The length of these projections is relatively immaterial, but they should preferably be of a width sufficient to engage all of the leaves at the section where the clip is used. This construction can clearly be seen in Figs. 3 and 4 in which projections 18 and 20 engage all three leaves.

If a large spring clip, as shown at 22 in Fig. 1, is desired, the inwardly extending projection 24 would be of such width as to engage all of the leaves at that section just as projection 18 engages the three leaves at its section.

To secure the main part of the clip in place, is a cover 26, having reversely turned flanges 28 and 30, complementary to and adapted to engage flanges 14 and 16, as shown in Figs. 3 to 7.

The inwardly extending projections 18 and 20, by their construction, are very rigid and cannot be distorted by the forces imposed thereon. Thus the flat inner surfaces of projections 18 and 20 will remain flat and rest firmly against the sides of the spring leaves after the clip is secured in position by engagement of cover 26, as can be seen in Fig. 4. This construction results in marked advantages of operation.

My spring clip is applied to the spring as follows: The bottom 4 is positioned against the main leaf, as shown in Fig. 1. The sides 6 and 8 are then pressed toward each other until they engage the sides of the leaves, as shown in Fig. 3. In this position it will be observed that there is still a distinct amount of clearance between the corners of the clip 32 and 34, and the adjacent corners of the spring. Thereafter, when cover 26 is forced downwardly to complete the locking engagement with flanges 14 and 16, the corners 32 and 34 will be drawn inwardly, as shown in Fig. 4, but due to the inherent rigidity of projections 18 and 20, these projections will retain their form and continue to engage all of the leaves. Thus, by my construction, the possibility of the sides 6 and 8 springing away from the intermediate leaves as the clip is secured in position is eliminated. From the construction shown in Fig. 4, it is believed obvious that none of the leaves can shift laterally with relation to the others.

In Fig. 5, I show a modification in which the same result, namely,—preventing lateral shifting of the leaves, is accomplished by a slightly different construction but utilizing the same principle. While the clip is of the same general construction as that shown in Figs. 2, 3 and 4, the projections 36 and 38 are of such width as to engage the intermediate leaf or leaves only. By constructing the spring clip accurately so that the corners of the outer leaves will fit snugly into the corners of the clip, as at 40, 42, 44 and 46, when the clip is in secured position as in Fig. 5, it is clear that lateral shifting of the leaves will be prevented. This construction, however, requires more accurate fitting than the construction of Fig. 2.

Figs. 6 and 7 show still another construction. In this case, instead of having definite projections extending inwardly from the sides of the clip, the sides of the clip are formed on an arc having their convex portions on the inside, as at 48 and 50. Thus, when the clip reaches its final position, as shown in Fig. 7, the spring-like concave sides 48 and 50 bring definite pressure to bear on the intermediate leaves while the corners 40, 42, 44 and 46 engage the outer leaves whereby lateral shifting of the leaves is prevented. Likewise, in this case, as in the form shown in Fig. 5, the clip must be accurately constructed so that the outside leaves will be properly engaged.

While I have disclosed preferred embodiments of my invention, I do not intend to be limited thereby, but only by the appended claims.

I claim:

1. Means for applying opposed lateral pressure to the edges of the leaves of a leaf spring at any selected section comprising two reinforced side portions of sheet metal formed to engage the edges of all of said leaves and other portions of sheet metal connecting said side portions to form a continuous band, at least one of said other portions including take-up means to draw said side portions toward each other whereby opposed lateral pressure may be applied to all of said leaves, the reinforced side portions capable of maintaining engagement with the edges of all leaves regardless of the pressure created by said take-up means, the thickness of said sheet metal being less than that required to maintain non-reinforced side portions undeformed under similar conditions of tension in said other portions.

2. Means for applying opposed lateral pressure to the edges of leaves of a leaf spring at any selected section comprising two reinforced side portions of sheet metal formed to engage opposite edges of one or more intermediate leaves and other portions of sheet metal connecting said side portions to form a continuous band, take-up means to draw said side portions toward each other whereby opposed lateral pressure may be applied to said leaves, the reenforced side portions capable of maintaining engagement with the edges of said leaves regardless of the pressure created by said take-up means, the thickness of said sheet metal being less than that required to maintain non-reinforced side portions undeformed under similar conditions of tension in said other portions.

3. Means for applying opposed lateral pressure to the edges of leaves of a leaf spring in any selected section comprising a channel-shaped member of flexible metal adapted to extend about three sides of said spring, sheet metal means for connecting the ends of said member on the fourth side of said spring including means for drawing the sides of said member tightly against the edges of said leaves, the sides of said member having rigid areas displaced inwardly of the main plane of said sides, said rigid areas being of a width greater than the thickness of a leaf of the spring, the inner surface of said areas adapted to engage the opposite edges of said leaves, said inwardly displaced areas in conjunction with the undisplaced side portions forming side walls having flexible and non-flexible portions.

4. A spring clip comprising a main section, said main section being formed of flexible metal having a bottom and two sides adapted to engage three sides of a leaf spring, said sides having rigid zones off-set inwardly from the normal planes of their respective walls, said rigid zones being of a width greater than the thickness of a spring leaf, reversely turned flanges on the fourth side connected with the sides of the main section, and a cover having reversely-turned flanges for engaging said first mentioned flanges to secure said clip on the spring, said reversely-turned flanges on said clip and cover being relatively proportioned whereby they deform said side walls and induce sufficient pressure to maintain said rigid zones in firm engagement with opposite side edges of more than one intermediate leaf.

5. In a spring clip, a band of flexible metal embracing three sides of a spring, said band having deformations providing rigid zones in opposed side walls thereof off-set inwardly from the normal planes of respective side walls and adapted to engage the side edges of the spring to hold said side walls spaced therefrom, and means interconnecting the free ends of said side walls for placing the same under sufficient tension to deform said side walls and to hold the clip on said spring, the yielding pressure induced by deformation of said side walls holding said rigid zones in firm engagement with opposite side edges of more than one leaf of said spring.

6. A spring clip comprising a channel-shaped section formed of flexible metal and adapted to embrace at least three sides of a leaf spring, said band having oppositely disposed substantially parallel bearing zones off-set inwardly from the normal planes of the sides of said section, said bearing zones being of a width greater than the thickness of a leaf of the spring, said bearing zones being rigid to a degree whereby they withstand distortion under pressure which causes distortion of the sides of said section.

7. A spring clip for holding the leaves of a spring in alignment, comprising a channel shaped section having a bottom and two sides, said sides having rigid zones disposed inwardly of their normal inner surfaces, said rigid zones being of a width greater than the thickness of a leaf of the spring, said rigid zones comprising reinforcement deformations on the side wall and being non-distortable under the stresses to which said clip is subjected, and means for placing said clip under sufficient tension to distort said side walls.

WARREN F. EISENHAUER.